United States Patent [19]

Van Delden

[11] Patent Number: 5,638,472
[45] Date of Patent: Jun. 10, 1997

[54] OPTICAL FIBER AND LENS ASSEMBLY HAVING A MOVABLE LENS AND A FIXED OPTICAL FIBER

[75] Inventor: Jay S. Van Delden, Montville, N.J.

[73] Assignee: Optics for Research, Caldwell, N.J.

[21] Appl. No.: 516,897

[22] Filed: Aug. 18, 1995

Related U.S. Application Data

[63] Continuation of Ser. No. 254,993, Jun. 7, 1994, abandoned, and Ser. No. 41,795, Apr. 1, 1993, abandoned.

[51] Int. Cl.$^6$ .................................................. G02B 6/32
[52] U.S. Cl. .................................................. 385/33; 385/25
[58] Field of Search .................................. 385/25, 33, 34, 385/35, 93, 15, 136, 137, 74, 119

[56] References Cited

U.S. PATENT DOCUMENTS

| | | | |
|---|---|---|---|
| 4,753,510 | 6/1988 | Sezerman | 350/96.21 |
| 4,886,337 | 12/1989 | Raagaard et al. | 385/33 |
| 4,889,406 | 12/1989 | Sezerman | 350/96.21 |
| 4,953,937 | 9/1990 | Kikuchi et al. | 385/33 |
| 5,009,481 | 4/1991 | Kinoshita et al. | 385/33 |
| 5,095,517 | 3/1992 | Monguzzi et al. | 385/74 |
| 5,231,686 | 7/1993 | Rabinovich | 385/93 |
| 5,253,313 | 10/1993 | Kishima | 385/93 |

FOREIGN PATENT DOCUMENTS

| | | | |
|---|---|---|---|
| 60-252311 | 12/1985 | Japan | 385/93 |
| 62-18508 | 1/1987 | Japan | 385/93 |
| 1-48010 | 2/1989 | Japan | 385/93 |
| 1-35406 | 2/1989 | Japan | 385/34 |
| 2158605 | 11/1985 | United Kingdom | 385/74 |

*Primary Examiner*—John Ngo
*Attorney, Agent, or Firm*—John N. Bain; Raymond J. Lillie

[57] ABSTRACT

An optical fiber and lens assembly which comprises a housing, an optical fiber, means for rendering the optical fiber immobile within the housing, a lens, and means for moving the lens within the housing. Such an optical fiber and lens assembly enables one to provide controlled movement of the lens, independently of the optical fiber, in response to changes in the focal length of the lens, the wavelength of light, and intended usages of the light.

16 Claims, 2 Drawing Sheets

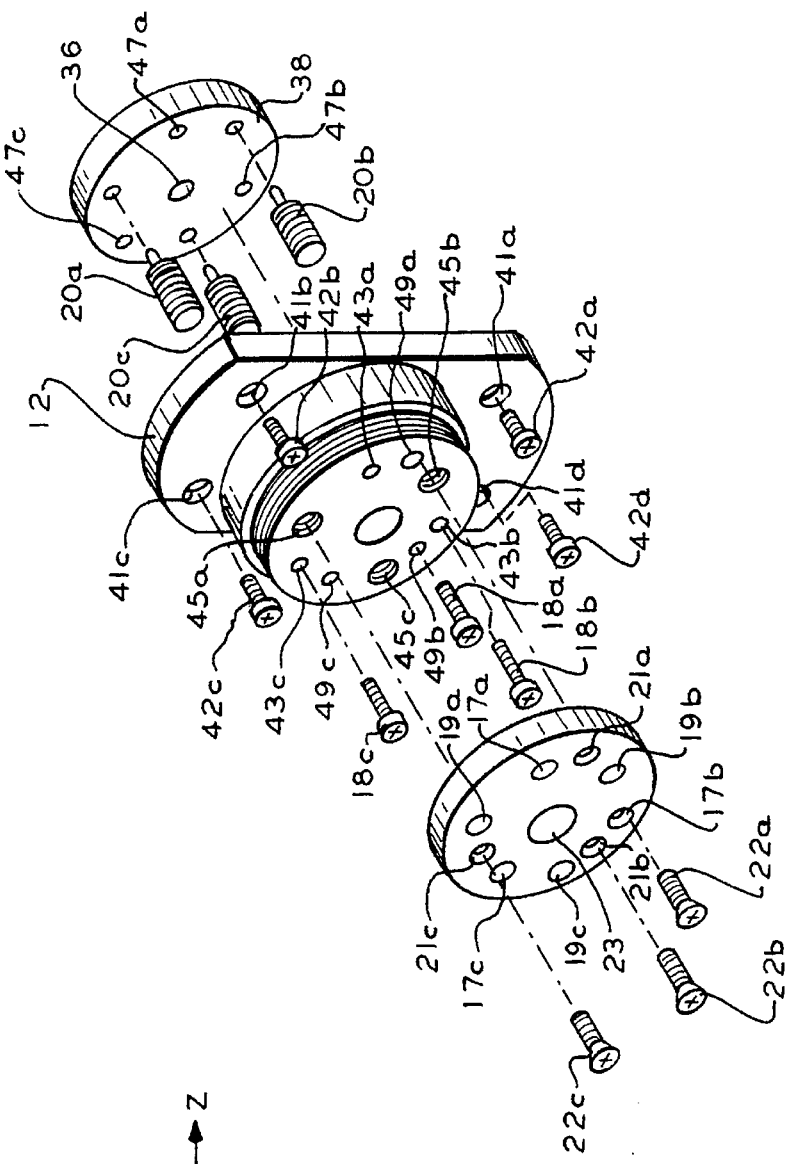
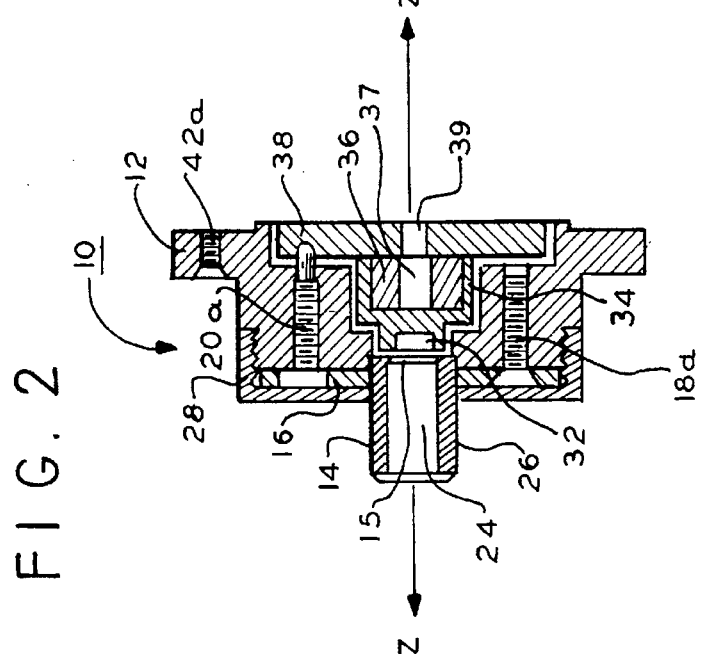

OPTICAL FIBER AND LENS ASSEMBLY HAVING A MOVABLE LENS AND A FIXED OPTICAL FIBER

This is a continuation application of application Ser. No. 041,795, filed Apr. 1, 1993, now abandoned, and application Ser. No. 08/254,993 filed Jun. 7, 1994 now abandoned.

BACKGROUND OF THE INVENTION

This invention relates to an optical fiber and lens assembly. More particularly, this invention relates to an optical fiber and lens assembly having a movable lens and a fixed optical fiber.

Optical fiber and lens assemblies are employed for focusing or collimating beams of light in or out of optical fibers, respectively. Such assemblies may be employed singly or in series. In such assemblies, the positioning of the lens(es) and optical fiber(s) depends upon various factors, such as the focal length, wavelength, and intended use of the light. U.S. Pat. Nos. 4,753,510 and 4,889,406, both issued to Sezerman, are directed to adjustable connectors for optically connecting a pair of optical fibers. In the Sezerman patents, an optical fiber is placed contiguous to a lens. The fiber and lens are contained and fixed within a holder which is fixed within a base plate. Such base plate then may be connected to another base plate containing an identical fixed lens and optical fiber assembly. A resilient member is disposed between the base plates. Thus, one fixed fiber and lens assembly may be adjusted with respect to the other fixed fiber and lens assembly. Alternatively, each base plate containing a fixed fiber and lens assembly may be attached to opposite ends of an optical coupling box. A resilient member is disposed between each base plate and the optical coupling box. Each fixed fiber and lens assembly then may be adjusted with respect to the other fixed fiber and lens assembly attached to the opposite end of the optical coupling box. Such attachment is often found to drift out of alignment, and thus requires further adjustment from time to time.

It is an object of the present invention to provide an optical fiber and lens assembly in which the optical fiber is fixed, and the lens is movable with respect to the fiber. This major conceptual difference allows for a more stable device, and thus additional realignment is not required.

In accordance with an aspect of the present invention, there is provided an optical fiber and lens assembly. The assembly comprises a housing, an optical fiber, and means for rendering the optical fiber immobile within the housing. The assembly also includes a lens, and means for moving the lens within the housing.

In one embodiment, the means for rendering the optical fiber immobile within the housing comprises a receptacle means fixed within the housing, and a connector means holding the optical fiber. The connector means fits within the receptacle means to render the optical fiber immobile within the receptacle means and the housing.

The receptacle means may be fixed within the housing by means of cement or adhesive. In a preferred embodiment, in addition to cement or adhesive, the means for rendering the optical fiber immobile within the housing further comprises a clamping means attached to and surrounding the receptacle means. The clamping means holds the receptacle means within the housing.

In one embodiment, the means for moving the lens within the housing comprises a lens holding means containing the lens. The lens holding means is contained within the housing. A reference plate is adjacent the lens holding means. The lens holding means is disposed between the optical fiber and the reference plate. The means for moving the lens within the housing also comprises means for moving the lens holding means along a first axis (sometimes hereinafter referred to as the Z-axis) whereby the lens holding means is moved toward or away from the fixed optical fiber. (Such movement is sometimes hereinafter referred to as movement along the Z-axis, or in the Z-direction.) The means for moving the lens holding means toward or away from the optical fiber comprises at least one screw inserted through the housing and into the reference plate. The means for moving the lens within the housing also comprises means for moving the lens holding means along at least one of a second axis and a third axis (sometimes hereinafter referred to as the X-axis and the Y-axis, respectively) lying in a plane (sometimes hereinafter referred to as the XY plane) disposed at an angle to the first axis, whereby the lens is moved in such plane. (Such movement is sometimes hereinafter referred to as movement along the X-axis and/or the Y-axis, or in the XY plane.) Preferably, the XY plane is nominally perpendicular to the first axis, and the XY plane is nominally parallel to the face of the optical fiber proximal to the lens. The means for moving the lens holding means along the second axis and/or third axis comprises at least one screw inserted through the housing and contacting the lens holding means.

In a preferred embodiment, the means for moving the lens within the housing further comprises a magnet contained within the lens holding means. The magnet is disposed between the lens and the reference plate. The magnet is contiguous with the reference plate, and the reference plate is formed from a magnetic material. The magnetic attraction between the magnet and the reference plate provides for controlled movement of the lens within the housing when the lens is moved along the second axis and/or the third axis (i.e., the X-axis and/or the Y-axis in the XY plane).

In one embodiment, the means for moving the lens holding means along the first axis (i.e., along the Z-axis in the Z-direction) comprises three screws, which are inserted through three openings in the housing to be screwed into three openings in the reference plate. The three screws are spaced circumferentially in the housing and in the reference plate. Each screw is equidistant from the other two screws.

Preferably, the means for moving the lens holding means along the first axis further comprises at least one spring plunger inserted through the housing and contacting the reference plate. More preferably, the means for moving the lens holding means along the first axis further comprises three spring plunger means screwed into three threaded openings in the housing and contacting the reference plate. The three spring plunger means are spaced circumferentially in the housing. Each spring plunger is equidistant from the other two spring plungers.

In operation, the three screws act as "pull screws," whereby the screws pull the reference plate inwardly toward the housing. The spring plungers act as "push screws," whereby the spring plungers push the reference plate away from the interior of the housing. Thus, the screws and the spring plungers exert forces in opposite directions, and thereby act as a "positioning mechanism" for holding the lens and the lens holder in place once the lens holder and lens are moved to a desired position in the housing.

In one embodiment, the means for moving the lens within the housing further comprises at least one leaf spring means attached to the housing and biased against the lens holding means. Such leaf spring means serves to control the movement of the lens holding means within the housing in the XY plane.

In one embodiment, the means for moving the lens holding means along the second axis and/or the third axis comprises at least two screws inserted through the housing and contacting the lens holding means. By moving one or more of the at least two screws, the lens holder and the lens are moved along the second axis and/or the third axis to a desired position in the XY plane against the action of the leaf spring.

The invention will now be described with respect to the drawings, wherein:

FIG. 2 is a cross-sectional view of the optical fiber and lens assembly shown in FIG. 1; and FIG. 3 is an exploded view of the clamping plate, housing, reference plate, screws, and spring plungers of the assembly.

Figure 1:
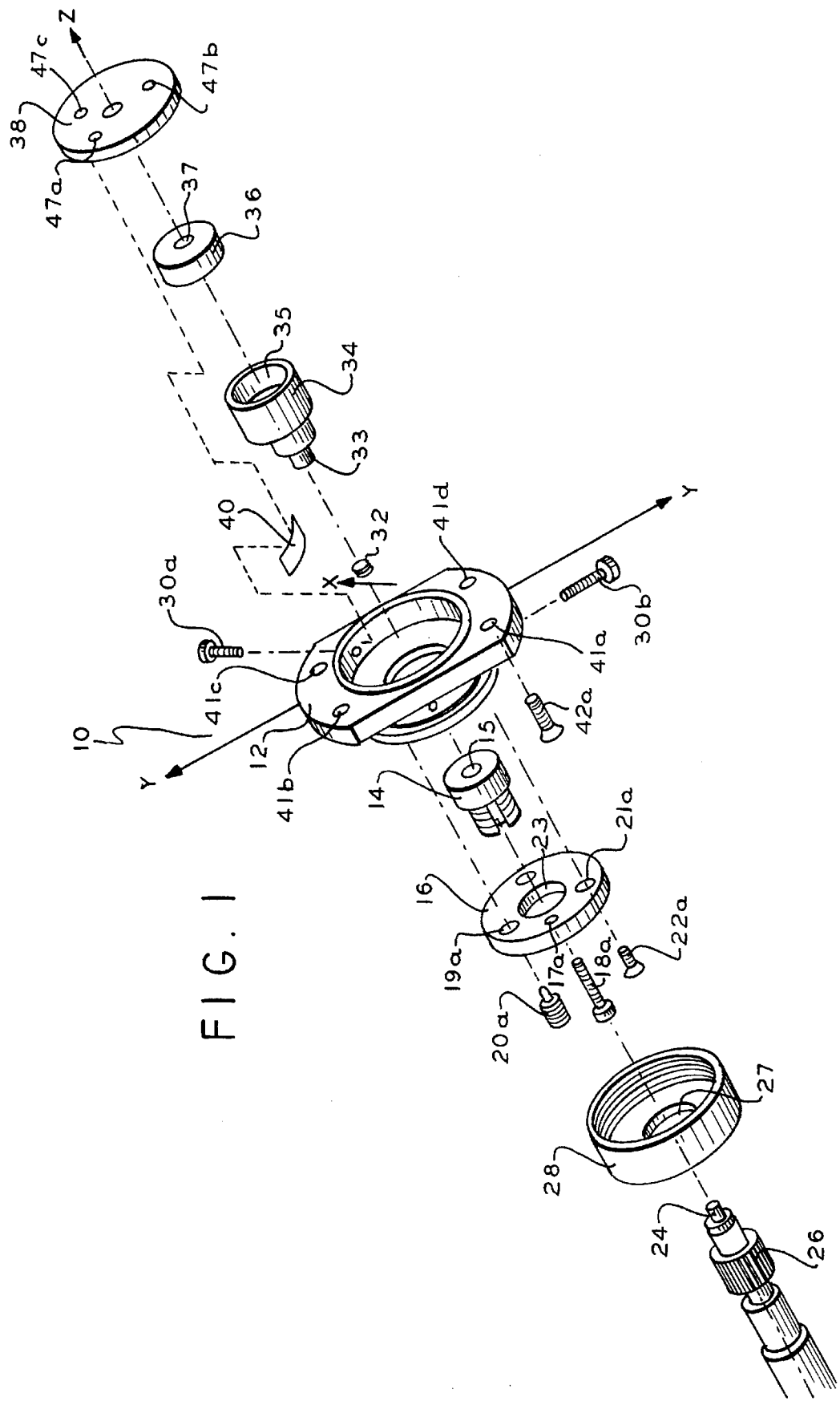
FIG. 1 is an exploded view of an embodiment of the optical fiber and lens assembly of the present invention.

Referring now to the drawings, an optical fiber and lens assembly 10 in accordance with the present invention includes a body or housing 12 which includes the functional components as hereinafter described. Contained within housing 12 is a receptacle 14 which includes an opening 15 which accommodates an optical fiber and connector therefor, and permits the passage of light therethrough. Receptacle 14 is held within housing 12 by cement or an adhesive, as well as by clamping means 16. Receptacle 14 is fitted within opening 23 of clamping means 16. Clamping means 16 is secured to housing 12 by means of screws 22a, 22b, and 22c which are inserted through holes 21a, 21b, 21c, respectively, of clamping means 16, and into holes 49a, 49b, and 49c, respectively, of housing 12. Screws 18a, 18b, and 18c are inserted through holes 17a, 17b, and 17c, respectively, of clamping means 16, through holes 43a, 43b, 43c, respectively, of housing 12, and into threaded holes 47a, 47b, and 47c, respectively, of reference plate 38. Spring plungers 20a, 20b, and 20c are inserted through holes 19a, 19b, and 19c, respectively, of clamping means 16, and into threaded holes 45a, 45b, and 45c, respectively, of housing 12, and contact reference plate 38. A cover 28 is screwed onto housing 12 and is adjacent clamping means 16. Cover 28 has an opening 27 to accommodate the passage of an optical fiber therethrough.

Optical fiber connector 26, which holds an optical fiber 24, inserted through opening 27 of cover 28 and into opening 15 of receptacle 14. Connector 26 is attached fixedly within receptacle 14. In this manner, optical fiber 24 is rendered immobile within housing 12.

Also contained within housing 12 is lens holder 34, which has openings 33 and 35. Contained within opening 33 is lens 32, and contained within opening 35 is magnet 36. Magnet 36 has an opening 37 to accommodate the passage of light therethrough. Adjacent lens holder 34 and magnet 36 is a magnetic reference plate 38. Reference plate 38 is contiguous with magnet 36. Reference plate 38 has an opening 39 to accommodate the passage of light therethrough.

Also included in the optical fiber and lens assembly 10 are radial screws 30a and 30b, which are inserted through holes 31a and 31b of housing 12, and radial screws 30a and 30b contact lens holder 34. Also attached inside housing 12 is leaf spring 40, which is also in contact with lens holder 34. Radial screws 30a and 30b and leaf spring 40 serve to regulate the movement of lens holder 34 within housing 12, whereby lens 32 travels along an axis in the XY plane. In general, the XY plane is nominally parallel to the face of optical fiber 24 which is proximal to lens 32.

Flat head screws 42a, 42b, 42c, and 42d, which are inserted through holes 41a, 41b, 41c, and 41d of housing 12, serve to fasten the optical fiber and lens assembly 10 to an object such as an optical coupling box.

The operation of the optical fiber and lens assembly 10 will now be described in detail. The assembly 10 provides for adjustment of lens 32 with respect to optical fiber 24. The required position of lens 32 is dependent upon various factors such as, for example, the focal length of the lens 32, the wavelength of the light, and the intended use of the light. Screws 18a, 18b, and 18c, and spring plungers 20a, 20b, and 20c, each of which contact reference plate 38, serve to move lens holder 34 and lens 32 along a first axis, in the Z-direction, whereby the lens 32 is moved more proximal to or more distal from optical fiber 24. Screws 18a, 18b, and 18c, as well as spring plungers 20a, 20b, and 20c, also serve to pitch the lens 32 at an acute angle to the Y-axis, if desired. Screws 18a, 18b, and 18c, as well as spring plungers 20a, 20b, and 20c, may also pitch lens 32 to an acute angle to the X-axis, if such is desired as well.

Screws 18a, 18b, and 18c are turned such that screws 18a, 18b, and 18c are inserted into holes 47a, 47b, and 47c, respectively, of reference plate 38. As more torque is applied to screws 18a, 18b, and 18c, screws 18a, 18b, and 18c act as "pull screws," and exert a force in a direction inwardly from housing 12, and pull reference plate 38 inwardly towards the center of housing 12. Such force also moves magnet 36, lens holder 34, and lens 32 inwardly toward the center of housing 12, thereby moving lens 32 more proximal to optical fiber 24. As less torque is applied to screws 18a, 18b, and 18c, less force is applied inwardly toward the center of housing 12 by screws 18a, 18b, and 18c, and lens 32 is moved more distal from the optical fiber 24.

While screws 18a, 18b, and 18c act as "pull screws," spring plungers 20a, 20b, and 20c act as "push screws," which exert a spring force against reference plate 38 in a direction opposite to that of screws 18a, 18b and 18c. Thus, screws 18a, 18b, and 18c, in combination with spring plungers 20a, 20b, and 20c, serve as a "positioning mechanism," whereby lens 32 is held in a desired position along the first axis. Once the correct position of the lens 32 is achieved with respect to optical fiber 24, along the Z-direction, this desired condition may be locked into place by further screwing the spring plungers 20a, 20b, and 20c all the way down against reference plate 38.

If one desires to pitch lens 32 to an acute angle to the Y-axis, and/or pitch lens 32 to an acute angle to the X-axis, one may apply greater torque to one or two of screws 18a, 18b, and 18c, and/or to one or two of spring plungers 20a, 20b, and 20c, than to the other one or two of screws 18a, 18b, and 18c, and/or to the other one or two of spring plungers 20a, 20b, and 20c.

Radial screws 30a and 30b serve to position lens 32 in the XY plane, which is disposed at an angle to the first axis, by positioning lens holder 34 against the action of leaf spring 40. Such plane may be perpendicular to the Z-axis, or at an acute angle to the Z-axis. If one desires to move lens 32 to a desired position along the second axis and/or the third axis, one applies a desired torque to each of radial screws 30a and 30b, each of which contact lens holder 34, whereby lens holder 34 and lens 32 are moved to a desired position. In order to control the movement of lens holder 34 and of lens 32, magnet 36 is in contact with and moves along reference plate 38. The attraction of reference plate 38 to magnet 36 prevents the lens holder 34 and lens 32 from being dislodged from a desired position once the lens holder 34 and lens 32 is placed in such desired position along the Z-axis with respect to the optical fiber 24. In addition, the biasing of leaf spring means 40 against lens holder 34 also serves to control the movement of lens holder 34 within housing 12 against radial screws 30a and 30b.

Thus, in summary, the screws 18a, 18b and 18c and plungers 20a, 20b and 20c cooperate to axially position the lens 32 along the Z axis, radially position the lens 32 relative to the Z axis, and selectively rotate the lens 32 relative to any combination of the X, Y and Z axes. For example, in FIG. 2, the X-Y plane is normal to the plane of the drawing Figure and to the Z axis. The X-Z plane is normal to the plane of the drawing Figure and the Y-Z plane is parallel to the plane of drawing Figure. The lens 32 can be selectively rotated by the plungers relative to each of these axes and planes to provide the aforementioned or other acute angles relative to any combination of the axes and planes.

Once lens holder 34 and lens 32 are placed at a desired position along the Z-axis and in the XY plane, the optical fiber and lens assembly 10 is then employed to transmit or receive light of a desired wavelength. Light may travel from optical fiber 24, through lens 32, through opening 37 in magnet 36, and through opening 39 in reference plate 38. The light then travels into a system, such as another optical fiber and lens assembly or an optical isolator or an optical circulator, for example, or the light may begin its intended use. Alternatively, the light may travel through opening 39 in reference plate 38, through opening 37 in magnet 36, through lens 32, whereby the light is focused into optical fiber 24.

Advantages of the present invention include the ability to adjust the position of the lens in an optical fiber and lens assembly independently of the optical fiber. In addition, the present invention enables one to move the lens along a first axis and a second axis while the optical fiber remains fixed. Thus optimal positioning of the lens in response to changes in the focal length of the lens and in the wavelength of the light, for example, can be attained. Such an assembly, therefore, provides advantages over optical fiber and lens assemblies in which the lens and optical fiber are fixed with respect to each other, and the position of the lens with respect to the optical fiber cannot be changed in response to changes in the focal length of the lens and/or the wavelength of light.

It is to be understood, however, that the scope of the present invention is not to be limited to the specific embodiments described above. The invention may be practiced other than as particularly described and still be within the scope of the accompanying claims.

What is claimed is:

1. An optical fiber and lens assembly comprising:

a housing;

an optical fiber;

means for rendering said optical fiber immobile within said housing;

lens means mounted within the housing immediately opposite the end of the optical fiber in the housing;

means for moving the said lens means within said housing toward and away from the optical fiber;

means for tilting said lens means within said housing about an axis normal to the axis of the housing in planes normal to the axis of said optical fiber;

coupling means on the end of the optical fiber in the housing;

optical fiber receptacle means fixed within said housing having an internal passage to receive the coupling means on the end of the optical fiber;

the coupling means engaged within the internal passage in the receptacle means to render said optical fiber immobile within said receptacle means and said housing.

2. The assembly of claim 1 wherein said means for rendering said optical fiber immobile within said housing further comprises a clamping means attached to and surrounding said receptacle means, said clamping means holding said receptacle means within said housing.

3. The assembly of claim 2 wherein said means for moving said lens within said housing comprises:

a lens holding means containing said lens, said lens holding means being contained within said housing;

a reference plate adjacent said lens holding means, whereby said lens holding means is disposed between said optical fiber and said plate means;

means for moving said lens holding means along a first axis whereby said lens holding means is moved toward or away from said optical fiber, said means for moving said lens holding means toward or away from said optical fiber comprising at least one screw inserted through said housing and into said reference plate; and means for moving said lens holding means along at least one of a second axis and a third axis, said second axis and said third axis lying in a plane disposed at an angle to said first axis, said means for moving said lens holding means along said at least one of said second axis and said third axis comprising at least one screw inserted through said housing and contacting said lens holding means.

4. The assembly of claim 3 wherein said means for moving said lens within said housing further comprises a magnet contained within said lens holding means, said magnet being disposed between said lens and said plate, and wherein said magnet is contiguous with said plate, and wherein said plate is formed from a magnetic material.

5. The assembly of claim 3 wherein said means for moving said lens holding means along said first axis comprises three screws inserted through three openings in said housing, and into three openings in said reference plate, and wherein said three screws are spaced circumferentially in said housing and in said reference plate, and each screw is equidistant from the other two screws.

6. The assembly of claim 5 wherein said means for moving said lens holding means along said first axis further comprises at least one spring plunger inserted through said housing and contacting said plate.

7. The assembly of claim 6 wherein said means for moving said lens holding means along said first axis further comprises three spring plunger means inserted through three threaded openings in said housing, and wherein said three spring plunger means are spaced circumferentially in said housing, and each spring plunger is equidistant from the other two spring plungers.

8. The assembly of claim 3 wherein said means for moving said lens within said housing further comprises at least one leaf spring means attached to said housing and biased against said lens holding means.

9. The assembly of claim 3 wherein said means for moving said lens holding means along said second axis comprises at least two screws inserted through said housing and contacting said lens holding means.

10. An optical fiber and lens assembly comprising:

a housing;

an optical fiber defining a first optical axis;

means for rendering said optical fiber immobile within said housing;

a lens disposed on said first optical axis; and means for selectively radially, axially, and rotationally moving said lens within said housing relative to said first optical axis, said means for moving said lens within said housing comprising:

lens holding means containing said lens, said lens holding means being contained within said housing;

a reference plate adjacent said lens holding means whereby said lens holding means is disposed between said optical fiber and said plate;

means for moving said lens holding means along said first optical axis whereby said lens holding means is moved toward or away from said optical fiber; and means for moving said lens holding means along at least one of a second axis and a third axis, said second axis lying in a plane disposed at an angle to said first axis and said third axis, said means for moving said lens holding means along said at least one of said second axis and said third axis comprising means coupled to said housing adjustably contacting said lens holding means.

11. The assembly of claim 10 wherein said means for moving said lens within said housing further comprises a magnet contained within said lens holding means, said magnet being disposed between said lens and said plate, and wherein said magnet is contiguous with said plate, and wherein said plate is formed from a magnetic material.

12. The assembly of claim 10 wherein said means for moving said lens holding means along said optical first axis comprises a plurality of screws inserted through a corresponding plurality of openings in said housing, and into a corresponding plurality of openings in said reference plate and wherein said screws are spaced equidistant from one another circumferentially in said housing.

13. The assembly of claim 10 wherein said means for moving said lens holding means along said optical first axis further comprises at least one spring plunger inserted through said housing and contacting said plate.

14. The assembly of claim 10 wherein said means for moving said lens holding means along said optical first axis comprises three spring plunger means inserted through three corresponding threaded openings in said housing, and wherein said three spring plunger means are spaced equidistant from one another circumferentially in said housing.

15. The assembly of claim 10 wherein said means for moving said lens within said housing further comprises at least one leaf spring means attached to said housing and biased against said lens holding means.

16. The assembly of claim 10 wherein said means for moving said lens holding means along said second axis comprises at least two screws inserted through said housing and contacting said lens holding means.

* * * * *